(12) United States Patent
Bomhoff

(10) Patent No.: US 10,729,212 B2
(45) Date of Patent: Aug. 4, 2020

(54) LIGHT EMITTING EARRING

(71) Applicant: John Bomhoff, Oviedo, FL (US)

(72) Inventor: John Bomhoff, Oviedo, FL (US)

(*) Notice: Subject to any disclaimer, the term of this patent is extended or adjusted under 35 U.S.C. 154(b) by 0 days.

(21) Appl. No.: 16/239,622

(22) Filed: Jan. 4, 2019

(65) Prior Publication Data

US 2019/0133268 A1 May 9, 2019

Related U.S. Application Data

(63) Continuation-in-part of application No. 15/466,193, filed on Mar. 22, 2017, now Pat. No. 10,219,592.

(60) Provisional application No. 62/311,578, filed on Mar. 22, 2016.

(51) Int. Cl.
*A44C 15/00* (2006.01)
*A44C 7/00* (2006.01)
*H05B 47/105* (2020.01)
*H04B 1/3827* (2015.01)
*H05B 45/00* (2020.01)
*H05B 47/19* (2020.01)

(52) U.S. Cl.
CPC .......... *A44C 15/0015* (2013.01); *A44C 7/003* (2013.01); *H05B 47/105* (2020.01); *H04B 1/385* (2013.01); *H05B 45/00* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 3,689,758 A | 9/1972 | Power | |
| 3,968,357 A | 7/1976 | Hamilton | |
| 4,337,504 A * | 6/1982 | Simpson | A44C 15/0015 362/104 |
| 4,459,645 A * | 7/1984 | Glatter | A44C 15/0015 174/50.55 |
| 5,140,840 A * | 8/1992 | Miceli | A44C 7/003 362/104 |
| 5,951,158 A | 9/1999 | Upah | |
| 6,568,824 B2 | 5/2003 | Jantz et al. | |

(Continued)

OTHER PUBLICATIONS

Light up earrings for women Ayamaya IC ICLOVER. https://www.amazon.com/s/?ie=UTF8&keywords=light+up+earrings+for+women&tag=mh0b-20&index=aps&hvadid=78202816130189&hvqmt=b&hvbmt=bb&hvdev=c&ref=pd_sl_6b6vqk24wv_b.

*Primary Examiner* — Britt D Hanley
(74) *Attorney, Agent, or Firm* — Boudwin Intellectual Property; Daniel Boudwin

(57) ABSTRACT

A light emitting earring. The light emitting earring includes a light emitting unit comprising a base having a first side and second side, one or more LEDs disposed on the first side, and a pin disposed on the second side. The pin includes one or more electrical connections configured to extend through a first side of an ear and electrically connect to one or more electrical components that contacts a second side of the ear. A retainer is included, the retainer having a clip configured to secure the pin thereto. A hypoallergenic insulating material is disposed on the one or more electrical contacts. In one embodiment, a pattern generator operably connected to the light emitting unit includes an aperture configured to receive the pin therethrough. The pattern generator is configured to cause the one or more LEDs to flash in a desired pattern.

16 Claims, 5 Drawing Sheets

(56) References Cited

U.S. PATENT DOCUMENTS

2005/0120743 A1* 6/2005 Pickering ............... A44C 7/003
  63/12
2011/0191991 A1   8/2011 Meneau
2014/0323183 A1* 10/2014 Klein .................... H04B 1/385
  455/569.1

* cited by examiner

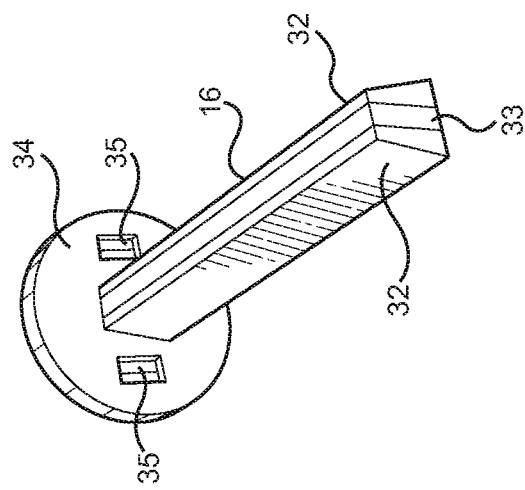
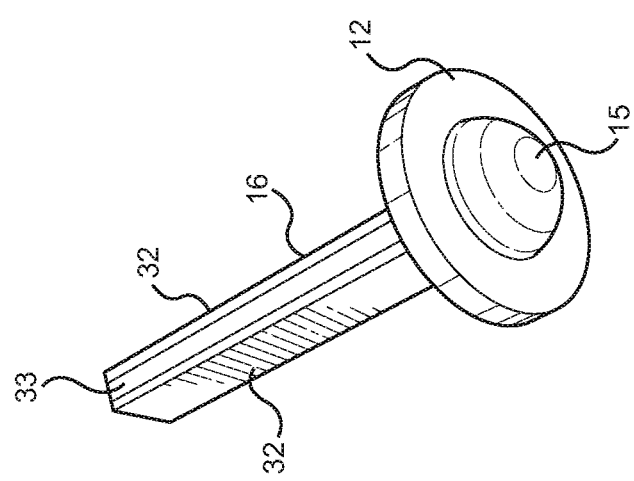
FIG. 3B
FIG. 3A

LIGHT EMITTING EARRING

CROSS REFERENCE TO RELATED APPLICATIONS

This application claims the benefit of U.S. patent application Ser. No. 15/466,193 filed on Mar. 22, 2017, which claims the benefit of U.S. Provisional Application No. 62/311,578 filed on Mar. 22, 2016. The above identified patent applications are herein incorporated by reference in their entirety to provide continuity of disclosure.

FIELD OF THE INVENTION

The present invention relates to earrings and other types of wearable jewelry. More particularly, the present invention provides an earring having a light emitting diode (LED) that can be secured to the ear or other parts of the body.

BACKGROUND OF THE INVENTION

Many individuals wear jewelry such as earrings for aesthetic purposes. Earrings are often worn for special occasions, but many people wear them every day. Earrings often go unnoticed due to poor lighting or other factors. Additionally, some individuals may wish to customize the appearance of their earrings without having to purchase many different earrings. Therefore, it is desirable to provide a light emitting earring having a pattern generator that allows an LED to emit light in a variety of patterns.

Devices have been disclosed in the known art that relate to lighted earrings. These include devices that have been patented and published in patent application publications. These devices generally relate to earrings having an LED or other light source. The devices in the known art have several drawbacks. These devices fail to provide battery-powered lighted earrings with hypoallergenic insulation components. Further, these devices fail to provide lighted earrings having an LED and pattern generator that allows the LED to emit light in various patterns.

In light of the devices disclosed in the known art, it is submitted that the present invention substantially diverges in design elements from the known art and consequently it is clear that there is a need in the art for an improvement to existing light emitting earrings. In this regard the present invention substantially fulfills these needs.

SUMMARY OF THE INVENTION

In view of the foregoing disadvantages inherent in the known types of light emitting earrings now present in the prior art, the present invention provides a light emitting earring wherein the same can be utilized for providing convenience for the user when wearing an earring that emits light. The light emitting earring includes a light emitting unit comprising a base having a first side and second side, one or more LEDs disposed on the first side, and a pin disposed on the second side. The pin includes one or more electrical connections configured to extend through a first side of an ear and electrically connect to one or more electrical components that contacts a second side of the ear. A retainer is included, the retainer having a clip configured to secure the pin thereto. A hypoallergenic insulating material is disposed on the one or more electrical contacts.

One object of the present invention is to provide a light emitting earring that includes a pattern generator configured to flash one or more LEDs in a desired pattern.

Another object of the present invention is to provide a light emitting earring that can be secured to the ear or any other part of the body.

A further object of the present invention is to provide a light emitting earring that includes a control circuit including a wireless transceiver configured to receive control signals from an external device.

Yet another object of the present invention is to provide a light emitting earring that includes a motion sensor configured to detect directional movement of the light emitting earring.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3A shows a front perspective view of the light emitting unit of the light emitting earring.

FIG. 3B shows a rear perspective view of the light emitting unit of the light emitting earring.

DETAILED DESCRIPTION OF THE INVENTION

Figure 1B:
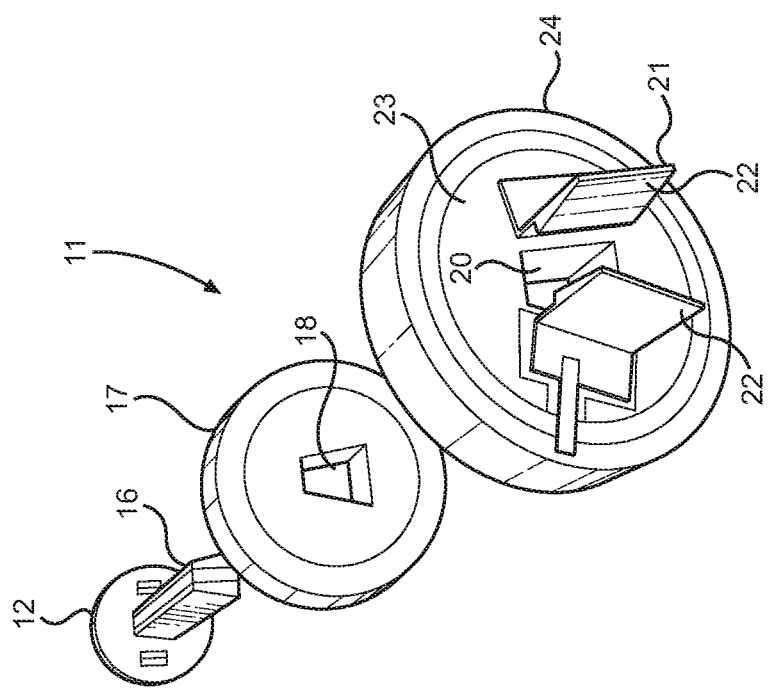
FIG. 1B shows a rear perspective exploded view of the light emitting earring.

Reference is made herein to the attached drawings. Like reference numerals are used throughout the drawings to depict like or similar elements of the light emitting earring. For the purposes of presenting a brief and clear description of the present invention, the preferred embodiment will be discussed as used for an earring configured to emit light in different patterns. The figures are intended for representative purposes only and should not be considered to be limiting in any respect.

Figure 1A:
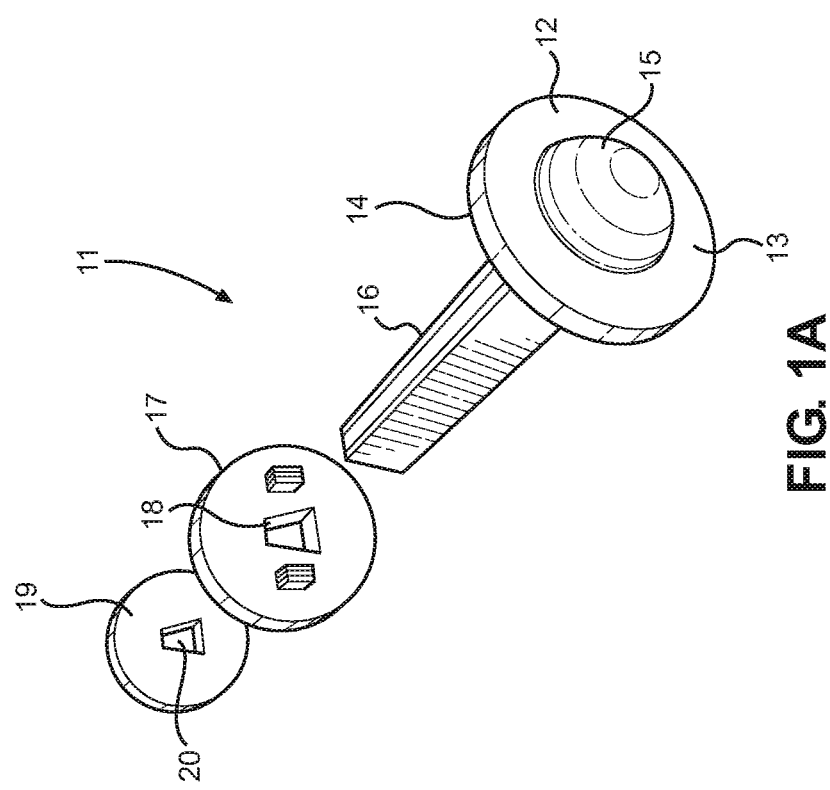
FIG. 1A shows a front perspective exploded view of the light emitting earring.

Referring now to FIGS. 1A and 1B, there are shown front and rear perspective exploded views of the light emitting earring, respectively. The light emitting earring 11 generally comprises a light emitting unit having a base 12. A pin 16 is disposed on a rear side 14 of the base 12. The pin 16 is inserted through a piercing opening when worn. Additionally, the pin 16 is configured to transfer energy from a battery to the light emitting unit. Specifically, the pin includes one or more electrical connections configured to extend through a first side of an ear and electrically connect to one or more electrical components that contact a second side of the ear. In the illustrated embodiment, the pin 16 comprises a trapezoidal cross section. However, other cross sections may be contemplated, such as rectangular or circular. In the shown embodiment, the light emitting earring 11 includes separated components. In an alternate embodiment, the light emitting unit and the one or more electrical components form a unitary housing. In such embodiments, the light emitting earring can be secured not only to the ear but to other parts of the wearer's body or clothing.

One or more LEDs 15 are disposed on a front side 13 of the base 12. In the illustrated embodiment, the base 12 is circular and includes one light element such as an LED 15 thereon. However, the configuration and shape of the base 12 can vary, such that it resembles different types of earrings such as a hoop earring or a dangling earring. Additionally, any number of LEDs 15 may be disposed on the base 12 in any desired position.

In one embodiment, the light emitting earring 11 further includes a pattern generator 17. The pattern generator 17 is in operable communication with the one or more LEDs 15 of the light emitting unit, and is configured to cause the one or more LEDs 15 to flash in a desired pattern. The pattern generator 17 further comprises an aperture 18 configured to receive the pin 16 therethrough. In the illustrated embodiment, the pattern generator aperture 18 is trapezoidal so as to be sized to receive the trapezoidal pin 16. However, the shape of the pattern generator aperture may vary to correspond to a differently shaped pin 16.

A retainer 19 is configured to secure the pattern generator 17 to the base 12 of the light emitting unit. The retainer 19 also secures the light emitting earring to the wearer. In the shown embodiment, the retainer 19 includes a housing 24 supporting a battery 23 therein. In other embodiments, the battery 23 can be disposed elsewhere within the light emitting earring. A clip 21 comprising a pair of opposing jaws 22 engages the pin 16 when the light emitting earring 11 is fully assembled. The retainer 19 further includes an aperture 20 configured to receive the pin 16 therethrough.

Figure 2B:
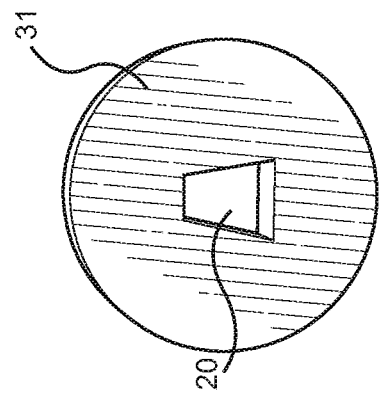
FIG. 2B shows a rear perspective view of the retainer component of the light emitting earring.
Figure 2A:
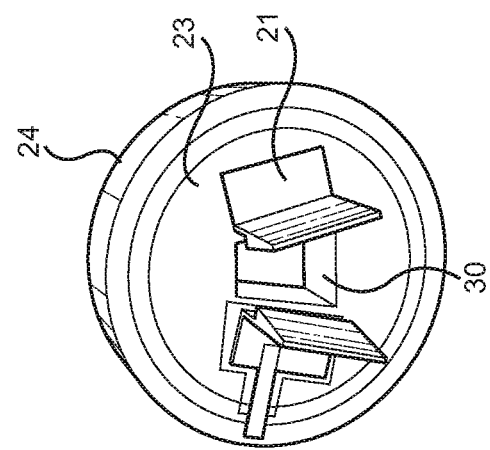
FIG. 2A shows a front perspective view of the retainer component of the light emitting earring.

Referring now to FIGS. 2A and 2B, there are shown front and rear perspective views of the retainer component of the light emitting earring, respectively. The battery 23 supported within the housing 24 provides electrical energy to the light emitting unit. The jaws 22 of the clip 21 are biased so as to releasably engage the pin, so that the earring can be easily secured and unsecured to the wearer. The retainer aperture 20 includes a conductive material 30 for facilitating energy transfer between the battery 23 and the pin.

The earring further includes a hypoallergenic insulating material configured to insulate the electric components to prevent shock. In one embodiment, the hypoallergenic material is disposed on the one or more electrical components. In one embodiment, the retainer further comprises a hypoallergenic insulating material 31 disposed on a side of the retainer opposing the electrical contacts, so that a wearer's skin will not be irritated when contacted by the retainer.

Referring now to FIGS. 3A and 3B, there are shown front and rear perspective views of the light emitting unit of the light emitting earring, respectively. The pin 16 further comprises an inner conductive layer 33 disposed between two opposing insulating layers 32. The conductive layer 33 allows energy to be transferred to the light emitting unit from the battery via the pin 16. The light emitting unit further comprises a pair of pattern generator receivers 35 disposed on a rear side thereof, on opposing sides of the pin 16. The pattern generator receivers 35 are sized to receive electrical contacts of the pattern generator, so that the one or more LEDs 15 can flash in a desired pattern. In one embodiment, the light emitting unit can further include a secondary battery 34 therein, which can function as an additional energy source.

Figure 4B:
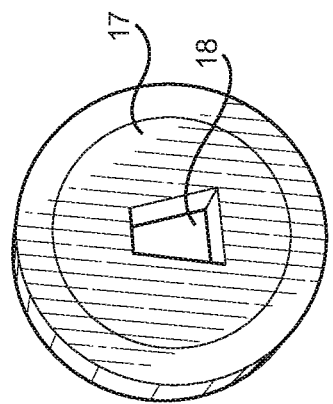
FIG. 4B shows a rear perspective view of the pattern generator component of the light emitting earring.
Figure 4A:
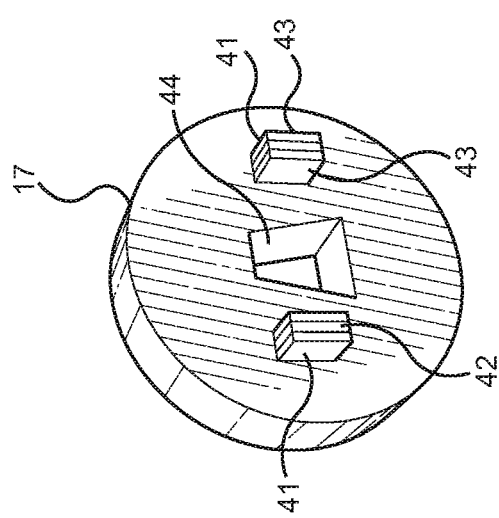
FIG. 4A shows a front perspective view of the pattern generator component of the light emitting earring.

Referring now to FIGS. 4A and 4B, there are shown front and rear perspective views of the pattern generator component of the light emitting earring, respectively. The pattern generator 17 includes an aperture 18 for receiving the pin, wherein the pin supplies energy from the battery to the pattern generator 17. The aperture 18 includes a conductive material 44 thereon for facilitating energy transfer from the battery. A pair of electrical contacts 41 are disposed on opposing sides of the aperture 18. Each electrical contact 41 includes an inner conductor 42 disposed between a pair of outer insulators 43. Similar to the retainer, the pattern generator 17 can include a hypoallergenic electrical insulation material on a side opposing the electrical contacts 41. In operation, the electrical contacts 41 connect to the pattern generator receiver contacts on the light emitting unit, while the pin provides energy from the battery to both the pattern generator 17 and the light emitting unit. This allows the one or more LEDs to flash in a variety of desired patterns.

Figure 5:
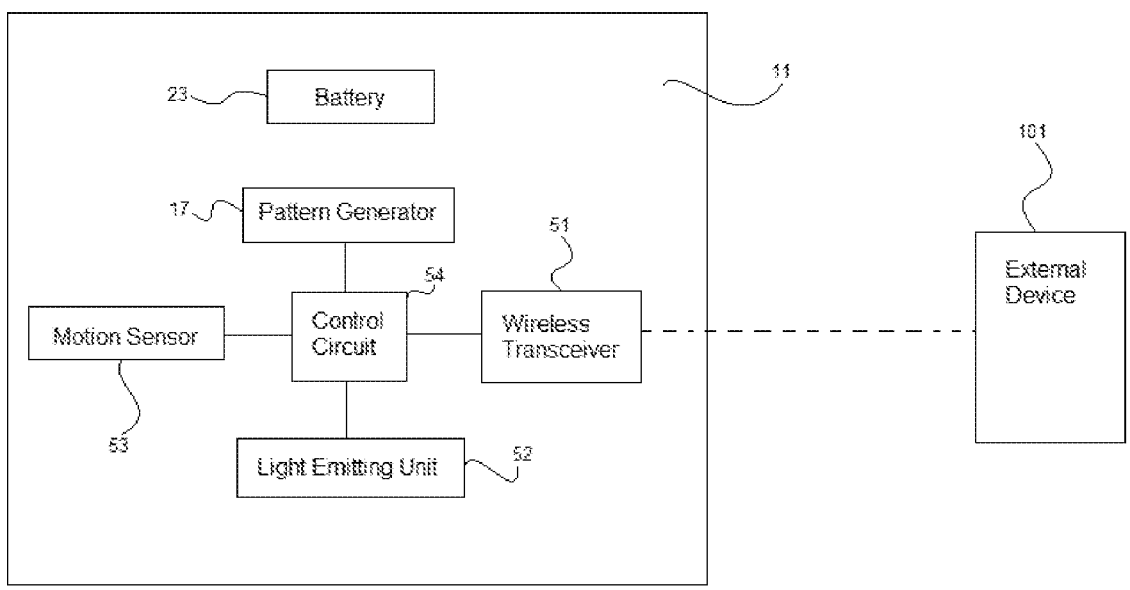
FIG. 5 shows a diagram of the electrical components of the light emitting earring.

Referring now to FIG. 5, there is shown a diagram of the electrical components of the light emitting earring. The light emitting earring 11 may include a variety of electrical components in addition to the light emitting unit 52. The electrical components are operably connected to the battery 23 and to a control circuit 54 that is configured to control the operation of the components. In the shown embodiment, the light emitting earring 11 includes a wireless transceiver 51 that is configured to receive command signals from an external device 101, such as a smartphone, tablet, dedicated remote control, or other suitable device that can send wireless signals over a wireless network. In the shown embodiment, the light emitting earring 11 further includes a motion sensor 53. The motion sensor 53 is configured to detect movement of the light emitting earring 11, and movement information obtained via the motion sensor 53 can be communicated to the external device 101 via the wireless transceiver 51. It is to be understood that embodiments that include or omit additional electrical components are within the scope of the present invention.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light emitting earring, comprising:
   a light emitting unit comprising a base having a first side and a second side, one or more LEDs disposed on the first side, and a pin disposed on the second side;

a battery operably connected to the light emitting unit;

wherein the pin includes one or more electrical connections configured to extend through a first side of an ear and electrically connect to one or more electrical components that contacts a second side of the ear;

a retainer having a clip configured to secure the pin thereto;

a hypoallergenic insulating material disposed on the one or more electrical components; and a control circuit including a wireless transceiver configured to receive control signals from an external device.

2. The light emitting earring of claim 1, wherein the light emitting unit and the one or more electrical components form a unitary housing, wherein the unitary housing is configured to be secured to a part of a body.

3. The light emitting earring of claim 1, wherein the battery is disposed within the retainer.

4. The light emitting earring of claim 1, wherein the one or more electrical components comprises a motion sensor configured to detect movement of the light emitting earring.

5. The light emitting earring of claim 1, wherein the one or more electrical components comprises a pattern generator having an aperture configured to receive the pin therethrough, the pattern generator in operable communication with the one or more LEDs.

6. The light emitting earring of claim 5, wherein the pattern generator is configured to flash the one or more LEDs.

7. The light emitting earring of claim 5, wherein the pattern generator comprises a housing, a pin receiving aperture, and a pair of electrical contacts disposed on opposing sides of the pin receiving aperture.

8. The light emitting earring of claim 7, further comprising a pair of pattern generator receivers disposed on a rear side of the base on opposing sides of the pin, wherein the pattern generator receivers are sized to receive the electrical contacts of the pattern generator.

9. The light emitting earring of claim 7, wherein the electrical contacts comprise an insulator surrounded by a pair of conductors.

10. The light emitting earring of claim 1, wherein the light emitting unit further comprises a secondary battery disposed therein.

11. The light emitting earring of claim 1, wherein the pin comprises a trapezoidal cross section.

12. The light emitting earring of claim 1, wherein the pin comprises an inner conductive layer disposed between two opposing insulating layers.

13. A light emitting earring, comprising:

a light emitting unit comprising a base having a first side and a second side, one or more LEDs disposed on the first side, and a pin disposed on the second side;

a battery operably connected to the light emitting unit;

wherein the pin includes one or more electrical connections configured to extend through a first side of an ear and electrically connect to one or more electrical components that contacts a second side of the ear;

a retainer having a clip configured to secure the pin thereto;

a hypoallergenic insulating material disposed on the one or more electrical components;

wherein the one or more electrical components comprises a motion sensor configured to detect movement of the light emitting earring.

14. The light emitting earring of claim 13, wherein the one or more electrical components further comprises a control circuit including a wireless transceiver configured to receive control signals from an external device.

15. A light emitting earring, comprising:

a light emitting unit comprising a base having a first side and a second side, one or more LEDs disposed on the first side, and a pin disposed on the second side;

a battery operably connected to the light emitting unit;

wherein the pin includes one or more electrical connections configured to extend through a first side of an ear and electrically connect to one or more electrical components that contacts a second side of the ear;

a retainer having a clip configured to secure the pin thereto;

a hypoallergenic insulating material disposed on the one or more electrical components;

wherein the one or more electrical components comprises a pattern generator having an aperture configured to receive the pin therethrough, wherein the pattern generator is in operable communication with the one or more LEDs.

16. The light emitting earring of claim 15, wherein the one or more electrical components further comprises a control circuit including a wireless transceiver configured to receive control signals from an external device.

* * * * *